US007841474B2

(12) United States Patent
Grey et al.

(10) Patent No.: US 7,841,474 B2
(45) Date of Patent: Nov. 30, 2010

(54) BELTLESS RARE EARTH ROLL MAGNETIC SEPARATOR SYSTEM AND METHOD

(75) Inventors: Thomas J. Grey, Jacksonville, FL (US); Shivakumar S. Orekondy, St. Augustine, FL (US)

(73) Assignee: Outotec Oyj, Espoo (FI)

( * ) Notice: Subject to any disclaimer, the term of this patent is extended or adjusted under 35 U.S.C. 154(b) by 58 days.

(21) Appl. No.: 12/313,313

(22) Filed: Nov. 19, 2008

(65) Prior Publication Data

US 2010/0122940 A1 May 20, 2010

(51) Int. Cl.
*B03C 1/00* (2006.01)
*H02K 7/08* (2006.01)

(52) U.S. Cl. ....................... 209/219; 209/214; 310/90.5

(58) Field of Classification Search ................. 209/213, 209/214, 219; 310/90.5
See application file for complete search history.

(56) References Cited

U.S. PATENT DOCUMENTS 2,945,590 A * 7/1960 Stearns .................... 209/223.1
2,992,737 A * 7/1961 Buus ....................... 209/223.1
3,845,997 A * 11/1974 Boden et al. ............... 310/90.5
4,221,664 A * 9/1980 Lamke ....................... 209/213
4,650,132 A * 3/1987 Graf et al. ................ 242/484.6
5,092,986 A * 3/1992 Feistner et al. .............. 209/212
5,543,673 A * 8/1996 Katsumata et al. ......... 310/90.5
5,636,748 A * 6/1997 Arvidson ................. 209/223.2
6,068,133 A * 5/2000 Schonfeld et al. ........... 209/219
7,367,457 B2 * 5/2008 Warlitz et al. ............... 209/225
7,506,765 B2 * 3/2009 Franzreb et al. ............. 209/232
7,564,333 B2 * 7/2009 Molteni ...................... 335/306
2005/0103688 A1 * 5/2005 McHenry ................ 209/223.2

* cited by examiner

*Primary Examiner*—Joseph C Rodriguez
(74) *Attorney, Agent, or Firm*—Arthur G. Yeager, Esq.

(57) ABSTRACT

A material separator system and method for magnetically separating components of feedstock by directing the feedstock onto a thin rotating shell enclosing one or more rotating magnetic rolls capable of riding upon the interior of the shell. In one embodiment, a cam-and-bearing arrangement is used to permit the magnetic roll and shell each to rotate on its own independent axis. This provides the ability to adjust clearance, the line of contact, and the degree of contact between the magnetic roll and the shell. In another embodiment, a different arrangement provides the same capabilities. The system can be configured to drive a magnetic roll, which then drives the shell, or it can be configured to drive the shell, which then drives the magnetic roll. The system can also be configured as a retreater for retreating feedstock.

24 Claims, 14 Drawing Sheets

BELTLESS RARE EARTH ROLL MAGNETIC SEPARATOR SYSTEM AND METHOD

CROSS-REFERENCE TO RELATED APPLICATION

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Field of the Invention

The present invention broadly relates to the art of magnetic separation, and more specifically to a system and method that utilize magnetic separation techniques to separate a given feedstock into its magnetic and nonmagnetic components.

2. Relevant Art

Magnetic separation technology exploits the difference in magnetic properties between the magnetic and nonmagnetic components of a given feedstock.

Magnetic susceptibility is a general reference given to a particle's magnetic or nonmagnetic qualities. In the magnetic separation arena, a given feedstock is defined by its degree of magnetic susceptibility. This degree of magnetic susceptibility is an important factor in magnetically separating various components of the feedstock. Generally, lower strength magnets are employed early in the magnetic separation process to separate highly magnetic fractions from the feedstock. One or more additional stages of separation are then employed using stronger magnetic fields for separating less magnetically susceptible particles.

Another physical property affecting magnetic separation is the size, mass, or both size and mass of particles. Today, in general, the average particle size of processed minerals is finer than that processed in the past. As particle size decreases, conventional methods of dry magnetic separation become less effective. Three types of magnetic separator used for dry magnetic separation are the rare earth roll ("RER"), the recently developed HE10, and the rare earth drum ("RED").

Multi-Stage Processing

In a magnetic separation process, general practice is to utilize multi-pass or multi-stage processing. Multi-stage processing involves passing feedstock through a first stage of processing to split the feedstock into two or more streams. Typically these streams are broadly termed magnetic and non-magnetic. In this single split, two-product example, the resulting streams are then passed through another stage of magnetic processing to separate any magnetic minerals left in the nonmagnetic stream and to separate any nonmagnetic minerals left in the magnetic stream.

Multi-stage processing usually improves overall grade and recovery aspects of a magnetic separation process. In many cases, two or more stages of magnetic separation take place within the cabinet of a single industrial machine. This is known as a "non-magnetic retreat" configuration, which means that the non-magnetic product from a first stage of magnetic separation is re-treated in a second stage, and the non-magnetic product from the second stage is re-treated in a third stage. Note that, based on the exact mineral composition at a specific stage of processing, a different magnet design can be selected for that stage to optimize the separation efficiency of the overall multi-stage process.

The Conventional Rare Earth Roll

A conventional RER has a cassette assembly that supports an idler shaft and a hinged support mechanism. The shaft is connected to a cylindrical magnetic roll that rotates on its longitudinal axis. A belt, monitored by a tracking system, is installed over the magnetic roll, the idler roll, and cassette. The magnetic roll rotates, which in turn drives the belt, and the belt in turn drives the idler roll. Most often, the magnetic section of the RER is made from a combination of high strength permanent magnet rings and steel pole rings arranged to maximize magnetic force on the outer surface of the belt.

Generally, a vibratory or rotary feeder and a feed chute are used to present a continuous stream of feedstock directly onto the surface of the belt of the RER, near the idler roll. The feed is presented to the belt in the same direction as the motion of the belt. The velocity of the feedstock is closely matched to the velocity of the belt surface to minimize both the wearing of the belt and the skipping or bouncing of the particles. From the idler roll, the belt transports the material to the magnetic roll. The travel time allows the feedstock to settle, thus maximizing separation efficiency. As the feedstock travels over the magnetic roll, the magnetic particles are attracted to the magnet and tend to stick to the surface of the belt when atop the roll. Non-magnetic particles are carried away from the roll by their own momentum. Particles of the feedstock take different trajectories based on their degree of magnetic susceptibility and other physical properties, such as mass, shape, and density. One or more adjustable splitters are positioned below the magnetic roll to collect the particles in different hoppers. The most common arrangements are to have either one or two splitters that divide the material into either two products of magnetic and non-magnetic, or into three products of magnetic, non-magnetic, and middlings.

The RER has the advantage of high magnetic strength given that the inner surface of the belt is in direct contact with the outer surface of the RER magnet. In addition, the belt can be very thin, which provides for little or negligible interference with magnetic forces. Unfortunately, the resulting strong magnetic forces also attract fine magnetic dust to the magnetic roll, which then collects on the underside of the RER's belt as well. This decreases belt life and reduces separation efficiency. When the belt is replaced, the magnetic roll can be manually cleaned to rid it of the accumulation.

Also detrimental to separation efficiency in an RER is static charge buildup between the outer surface of the belt and fine particles. While feedstock travels the length of the belt to the magnetic roll, particles rub together creating a static charge that causes the fine non-magnetic, non-conductive particles to stick to the belt surface, thereby contaminating the magnetic stream and inhibiting proper separation.

Another disadvantage of the RER arises from the need to regularly replace the belt. Changing the belt on an RER can be tricky. If not done properly, the belt can develop folds, wrinkles, or tears leading to the belt's early failure. In addition, the idler roll and belt tracking system contain many additional parts that need to be monitored and maintained. Proper maintenance is important as the belts, and the mechanisms in place for their use, are costly.

The HE10

An HE10 is a variation of a conventional RER that, in general, uses an innovative method of supplying feedstock to an RER to increase separation efficiency. (For details, refer to U.S. Pat. No. 7,296,687 to Arvidson et al.) The HE10 accomplishes this by positioning a continuous stream of feedstock onto the belt of the HE10 at points where the belt crosses the magnetic roll. The feedstock is directed to selectable positions on the belt, at selectable angles of impact. Enhanced separation of the particles of the feedstock results from the combined forces of the feedstock impacting the belt, the resulting bounce of the feedstock from the belt, the force of gravity, and the simultaneous magnetic attraction of the magnetic roll.

The HE10 provides a strong magnetic force that permits the processing of fine particles of feedstock while also maintaining a reduced static buildup among the particles. The HE10 also contains improved dust control elements that help stave off the accumulation of particles on the underside of the belt and on the magnetic roll that can lead to premature belt wear and a loss of separation efficiency. The HE10 does not, however, completely prevent the accumulation of particles on the underside of the belt.

The Conventional Rare Earth Drum

A conventional RED has a shell that is thin, non-magnetic, and highly resistant to wear. The cylindrical shell is rotated longitudinally on a shaft via end plates and bearings using a drive system commonly consisting of a motor and a gearbox sometimes aided by drive belts and pulleys. The shaft remains stationary and supports a magnet assembly within the shell. The magnet assembly usually has a pie shape when viewed from its end, with the radius of the magnet assembly closely matching the inside radius of the shell. To maximize magnetic effect, the clearance between the magnet and shell is adjustable. Clearance between the inside of the shell and the surface of the magnet is generally minimized so that the strength of the magnetic field outside of the shell is maximized. Most often, the magnet assembly is made up of a combination of high strength permanent magnet blocks arranged in such a way as to maximize the strength of the magnetic field outside of the shell. All parts together are called a drum.

Generally, a vibratory or rotary feeder and a feed chute are used to present a continuous stream of feedstock directly onto the surface of the rotating shell of the RED, generally at a twelve o'clock position. The feedstock is presented to the drum in a direction that is approximately tangent to the shell surface, in the direction of rotation. The velocity of the feedstock is closely matched to the velocity of the drum to minimize both the wearing of the shell surface and the skipping or bouncing of the particles. As the material travels on the surface of the shell, the magnetic particles are attracted to the magnet assembly within the drum and so stick to the shell. Non-magnetic particles are carried away from the drum by centrifugal force. Particles of the feedstock take different trajectories based on their degree of magnetic susceptibility and other physical properties, such as mass, shape, and density. One or more adjustable splitters are positioned below the magnetic drum to collect the particles in different hoppers. The most common arrangements are to have either one or two splitters that divide the material into either two products of magnetic and non-magnetic, or into three products of magnetic, non-magnetic, and middlings.

The RED is most often used on feeds of larger sized particles. REDs with low intensity magnetic fields are used to sort highly magnetic material from feedstock. These REDs also are often used to protect feedstock from "tramp iron." Examples of tramp iron are pieces of machinery, nuts, bolts, and similar items that should be removed from the feedstock to ensure safety and quality of separation. Other REDs with higher intensity magnetic fields are used to concentrate various types of magnetic minerals and to separate less magnetic materials.

An RED's shell is thick enough to endure significant forces and wear. The shell is also impervious to the buildup of static charge. In addition, the drum of an RED is closed, keeping dust from collecting on the magnet assembly inside. An inherent disadvantage of the RED, however, is that its thicker shell reduces the strength of its magnetic field at the outside surface of the shell. Adding to this disadvantage is the requisite clearance between the magnet assembly and the inner surface of the shell.

What is needed is a magnetic separation system that reduces or eliminates static buildup and belt wear issues that can lead to increased operating costs and downtime, while also providing the magnetic field strength necessary to effectively separate both large and fine particles of a given feedstock.

BRIEF SUMMARY OF THE INVENTION

In accordance with this invention, magnetically separating components of a given feedstock is achieved by a system that directs the feedstock onto a beltless rare earth roll magnetic separator ("BRER") having a thin rotating shell containing one or more rotating magnetic rolls sealed within the shell that can be adjusted to contact the inner surface of the shell for superior magnetic performance resulting in superior separation efficiency. Through this invention, static buildup and belt wear issues are reduced or eliminated, leading to decreased operating costs and downtime. In addition, the magnetic field strength expressed at the surface of the BRER's shell allows for the effective separation of both large and fine particles of a given feedstock.

As mentioned above, the BRER is made up of a thin, generally cylindrical shell that encases one or more magnetic rolls so as to keep fine magnetic dust from reaching the roll. The interior of the shell is spacious enough to permit the magnetic rolls to be repositioned along various points within the shell. End plates are fitted at either end of the cylindrical shell to help seal out dust and other potential contaminates. The material of the shell is as thin as practical, non-magnetic, and resistant to wear. Examples of possible shell material are rubber, silicone, Kevlar®, aluminum, and titanium. The shell can be made to nearly any size, as long as the diameter of the shell is large enough to encase the magnetic roll or rolls within the shell.

The BRER is constructed so that the magnetic roll contacts the interior surface of the shell. The distance between the outside surface of the magnetic roll and the outside surface of the shell can be as small as approximately 0.005 inches or 0.127 millimeters. This narrow distance allows for superior magnetic performance resulting in superior separation efficiency. Contact between the magnetic roll and interior surface of the shell also, however, places a load on the interior of the shell. To provide the shell with support to withstand this load, the thin shell is supported by support rings that fit around the outside of the shell at both ends of the thin shell.

In a preferred embodiment, a system of cams and bearings is configured to allow a magnetic roll and shell each to rotate on its own independent axis. This allows the position of the magnetic roll to be adjusted relative to the shell. The system also allows for setting the contact pressure of the magnetic roll on the interior of the shell. The line at which the magnetic roll and shell meet is commonly called the line of contact. The system of cams and bearings allows this line of contact to be adjusted to various positions on the interior surface of the shell. Note that another preferred embodiment uses a different configuration to provide the above capabilities.

The BRER also contains means for driving the magnetic roll and shell. Usually, this means will include a conventional motor drive system powered by an AC or DC motor. Driving means can be configured to rotate the magnetic roll, rotate the shell, or rotate both the magnetic roll and the shell independently, based on the application and design considerations. When the shell is rotated, the rotation of the shell drives the magnetic roll causing it to rotate, with its outer surface rolling on the interior surface of the shell similar to how the tire on a vehicle rolls on pavement. When the magnetic roll is rotated, the rotation of the magnetic roll drives the shell causing it to rotate. When each is independently rotated, the speed of each can be synchronized, if desired, so as to maintain the same speed between the two to prevent slippage.

Generally, feedstock is fed directly onto the outside of the thin shell of the BRER at the line of contact where the shell is in direct contact with the magnetic roll. Feedstock is directed onto the shell at a given angle appropriate for optimizing separation based on specific properties of the feedstock. When necessary, the radial location of the feed input onto the shell can be adjusted. Also, when necessary, the line of contact can be radially adjusted. The ability to make adjustments to the feed input and to the line of contact is especially important in minerals processing, as no two deposits in the world are exactly alike, and each mineral suite dictates different separation strategies for different final products.

The BRER is also capable of retreating feedstock using a single-roll or multi-roll configuration. For example, each stage of retreatment can be performed by separate single-roll machines, or multiple stages of retreatment can be accomplished by just one multi-roll machine. It is even possible to use multiple multi-roll BRERs to perform multiple stages of retreatment on each machine.

BRIEF DESCRIPTION OF THE SEVERAL VIEWS OF THE DRAWING

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings, in which:

DETAILED DESCRIPTION OF THE PRESENT INVENTION

Figure 1:
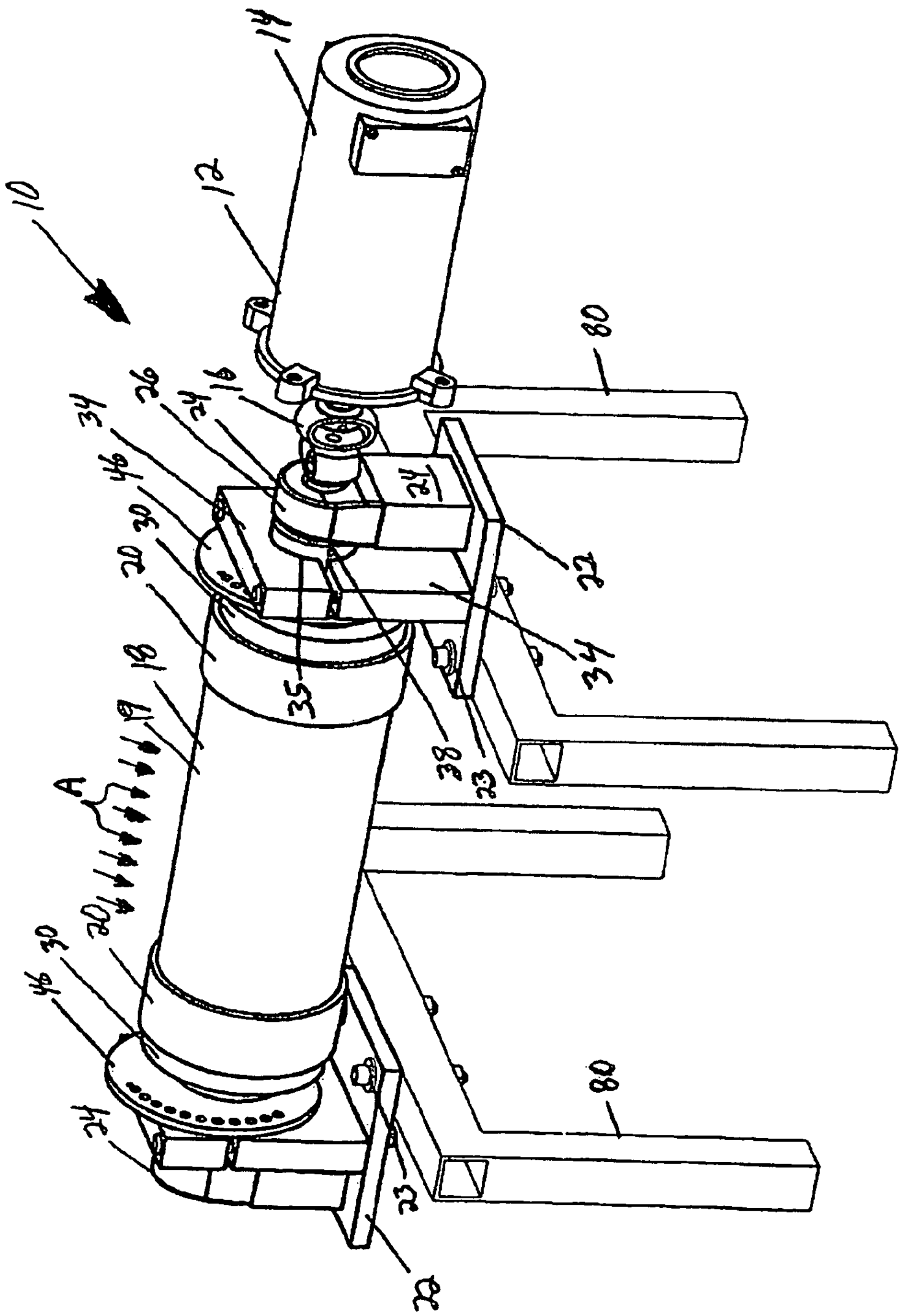
FIG. 1 is a front perspective view of a first embodiment of a beltless rare earth roll magnetic separator system, in accord with the present invention.

It should be noted that herein the word "elastic" is defined as capable of recovering size and shape after deformation.

Embodying the principles of the present invention is a beltless rare earth roll magnetic separator system ("BRER"), a preferred embodiment of which is depicted in FIGS. 1-17 and designated generally by reference numeral 10. The BRER 10 comprises a thin rotating shell 18 containing a magnetic roll 72 sealed within the shell 18 that can be adjusted to contact an inner surface 17 of the shell 18 for improved magnetic performance which aids in improved separation efficiency, as will be explained more fully herebelow.

Figure 2:
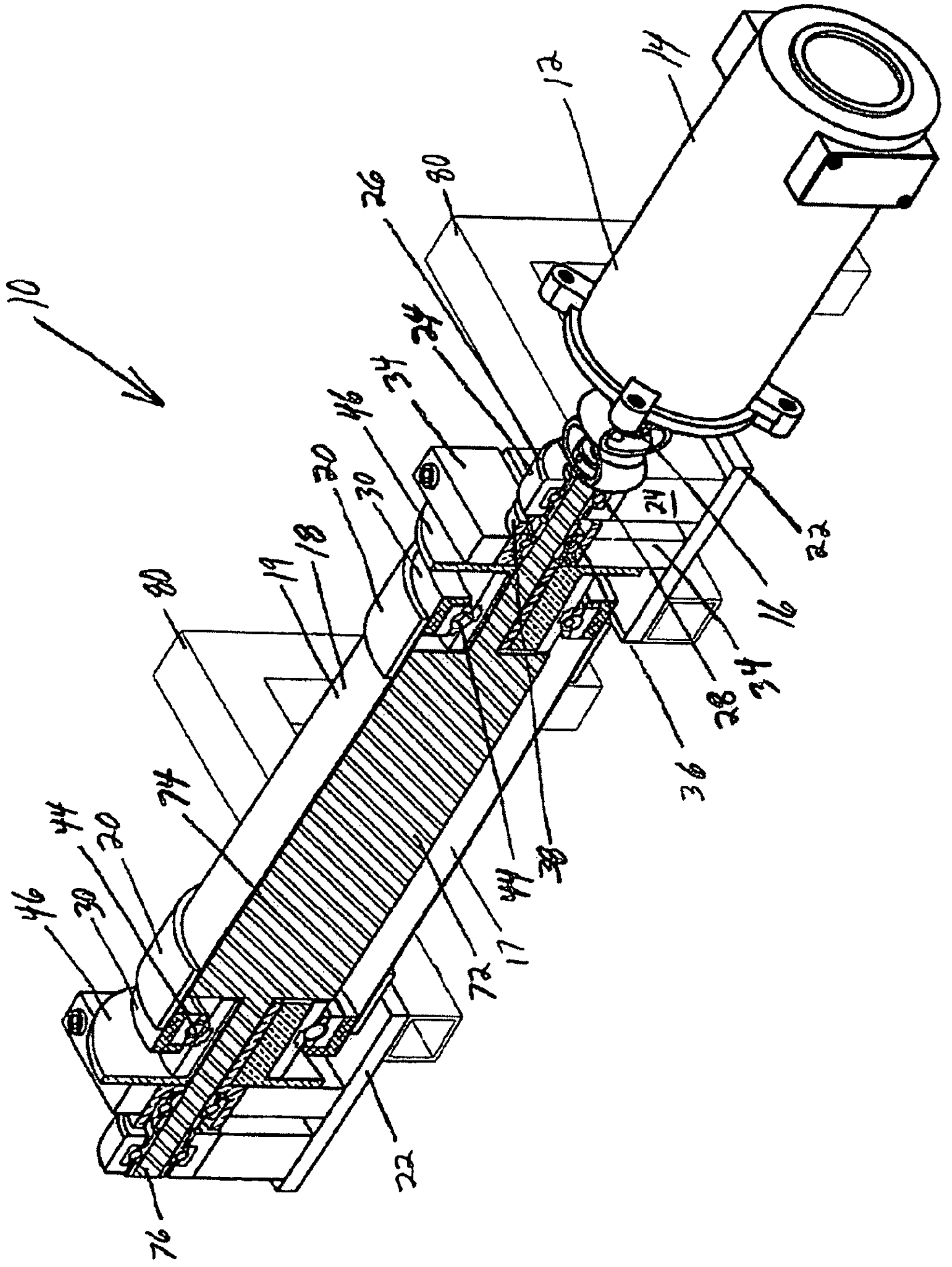
FIG. 2 is a partial cross-sectional view of FIG. 1.

Referring now to FIGS. 1 and 2, the BRER 10 comprises a pair of support plates 22 for securing the BRER 10 to a platform 80. Each support plate 22 is basically a flat plate with holes 23 extending therethrough. Fasteners are passed through the holes 23 in each support plate 22 and through holes 84 in the platform 80 to secure the support plates 22 to the platform 80. Each support plate 22 is also attached to the BRER 10 at a respective opposing end of the BRER 10, thereby securing the BRER 10 to the platform 80.

Continuing with FIGS. 1 and 2, the BRER 10 further comprises the shell 18, a pair of end plates 30, a pair of support rings 20, the magnetic roll 72 (see FIG. 2), and drive means 12. The shell 18 is substantially nonmagnetic and in the general shape of a cylinder open at opposing ends. The shell 18 comprises the inner surface 17 (see FIG. 2) and an outer surface 19. In the present embodiment, the preferred thickness of the shell 18 is approximately 0.005 inches. This is generally the minimum thickness. Greater thickness is possible. Typically, the thinner a shell 18, the greater influence an enclosed magnet will have on feedstock being separated. Any common means for directing particles to be separated onto the outer surface 19 of shell 18 may be employed and is illustrated by arrows A along the length of shell 18. Feedstock containing particles of varying degrees of magnetism to be separated is directed at the outer surface 19 of the shell 18. The shell 18 can be constructed of a number of materials, as long as the chosen material is substantially nonmagnetic and preferably strong and stiff. Examples of such materials are plastic, rubber, Kevlar®, aluminum, and titanium. In the present embodiment, the preferred construction material for the shell 18 is titanium.

Still referring to FIGS. 1 and 2, the end plates 30 are used to enclose the shell 18 to inhibit dust and other contaminates from entering the interior. Each of the pair of end plates 30 is substantially in the shape of a hollow cylinder and fitted to the shell 18 at a respective open end of the shell 18. An edge of the shell 18 aligns with the approximate center of a respective end plate 30 so that approximately half of the end plate 30 resides below the shell 18 and approximately half of the end plate 30 resides outside the shell 18 beyond the edge of the shell 18, as can be seen in FIG. 2. Each end plate 30 contains a large opening at its center. A portion of the magnetic roll 72 extends through this opening, as do other components of the BRER 10, as described herebelow.

Continuing with FIGS. 1 and 2, each of the pair of support rings 20 is substantially in the shape of a hollow cylinder and vertically encircles the shell 18, fitting snugly around the outer surface 19 of the shell 18. Each support ring 20 is located at an opposing end of the shell 18 above a respective the end plate 30. An edge of each support ring 20 aligns generally with a respective edge of the shell 18, such that each support ring 20 resides atop the end portion of the shell 18 and also above approximately half of the end plate 30 below the shell 18, as can be seen in FIG. 2. The support rings 20 support the structural integrity of the shell 18 by providing support to its outer surface 19. The shell 18 is held securely in place by the support rings 20 exerting force on its outer surface 19 and the end plates 30 exerting force on its inner surface 17.

Referring now to FIG. 2, the magnetic roll 72 comprises an elongated magnetic roll body 74 and a pair of elongated magnetic roll shafts 76. Both the magnetic roll body 74 and the magnetic roll shafts 76 are generally cylindrical with the magnetic roll shafts 76 of smaller diameter than the magnetic roll body 74. Each magnetic roll shaft 76 extends longitudinally from a respective opposing end of the magnetic roll body 74. A substantial portion of the magnetic roll 72 is contained within the shell 18, with a portion of each magnetic roll shaft 76 protruding beyond a respective end of the shell 18.

Referring again to FIGS. 1 and 2, the drive means 12 comprises a drive motor 14 and a drive coupling 16. The drive motor 14 is connected to one end of the drive coupling 16. The opposite end of the drive coupling 16 is connected to a proximate magnetic roll shaft 76 of the magnetic roll 72. When the drive motor 14 is energized, the drive coupling 16 rotates the connected magnetic roll shaft 76 and the magnetic roll 72. Under normal operation, the magnetic roll 72 is in constant contact with the inner surface 17 of the shell 18 (see FIG. 9) and the rotating magnetic roll 72 rotates the shell 18, as described below with reference to FIGS. 2-5.

Regarding FIGS. 1 and 2, the present embodiment envisions the drive motor 14 to be a DC motor. In an alternate embodiment, an AC motor serves as a drive motor 14 and transmits its power by way of a gearbox and a drive coupling 16. Other drive means 12 well known in the art may be used.

Figure 3:
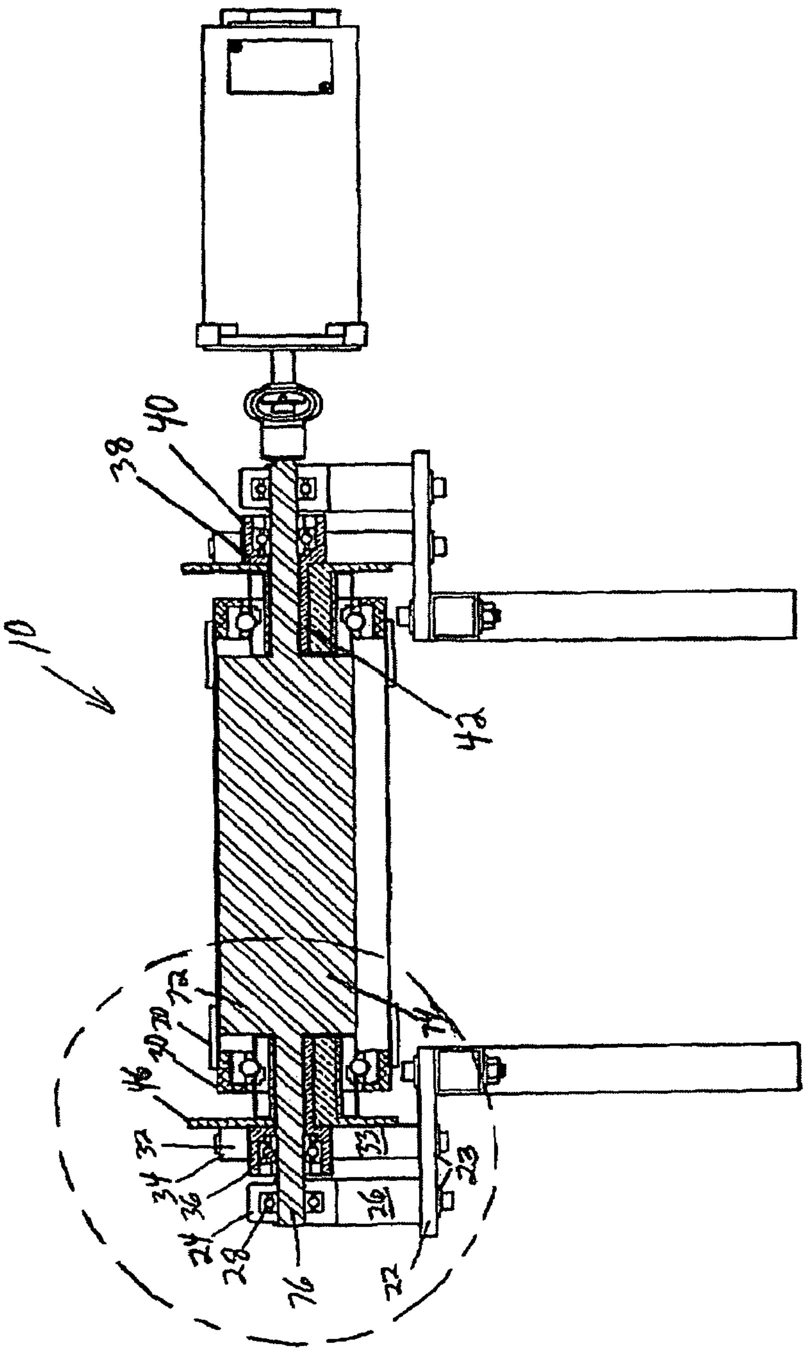
FIG. 3 is a partial cross-sectional view of FIG. 1.
Figure 4:
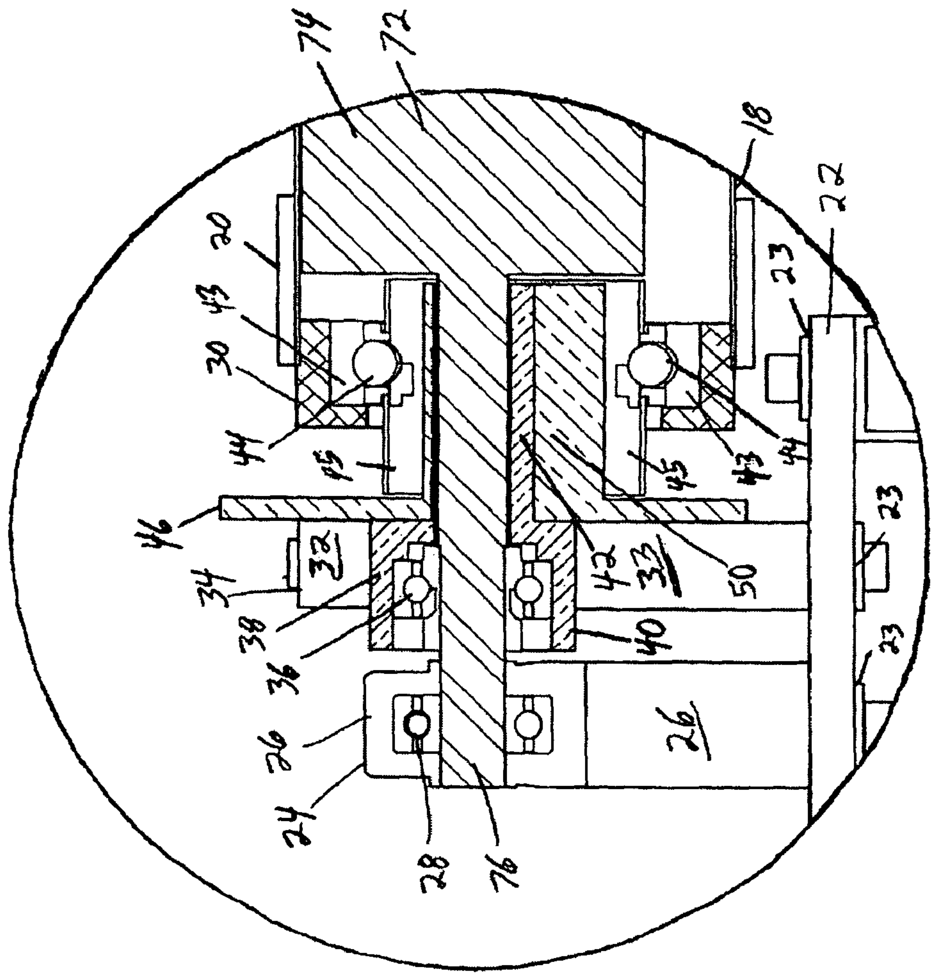
FIG. 4 is an enlarged partial view of FIG. 3.
Figure 5:
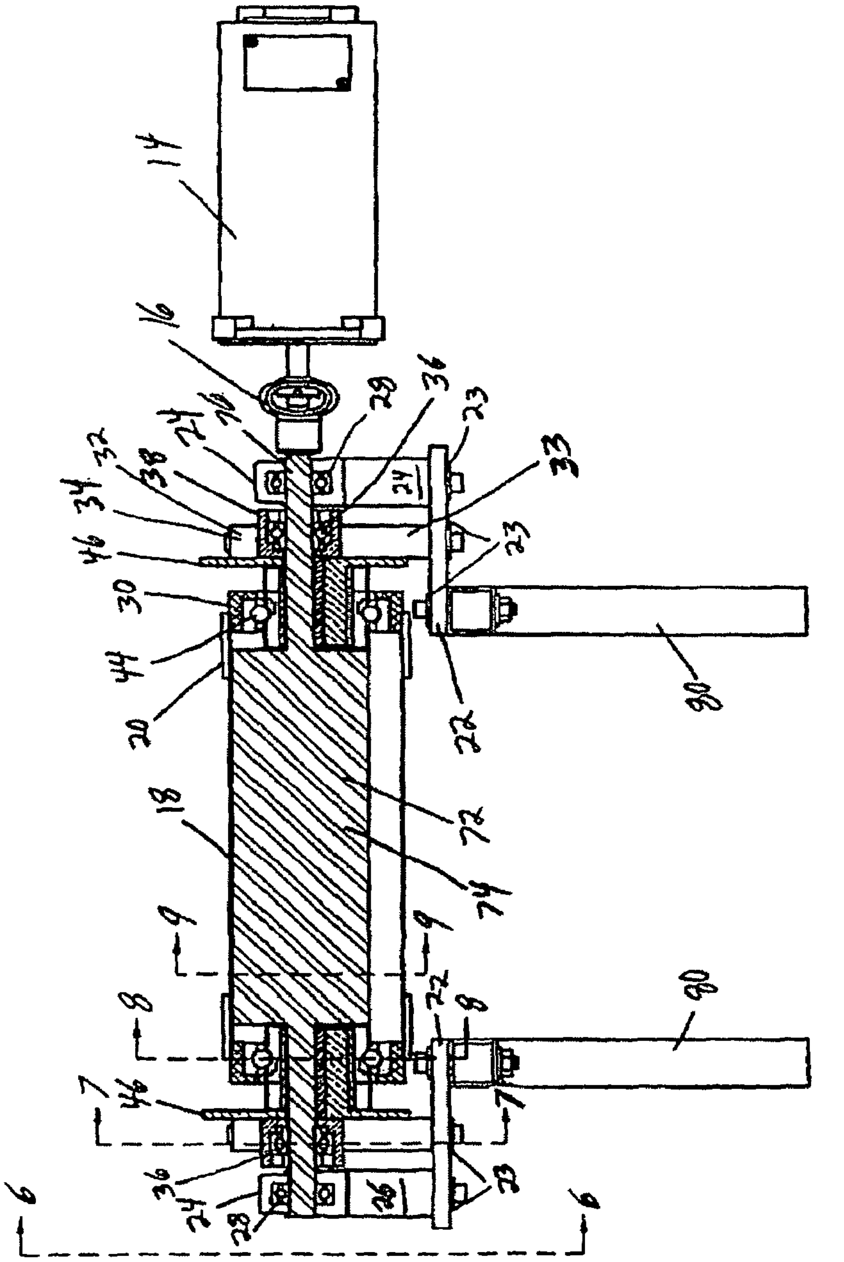
FIG. 5 is a partial cross-sectional view of FIG. 1.
Figure 6:
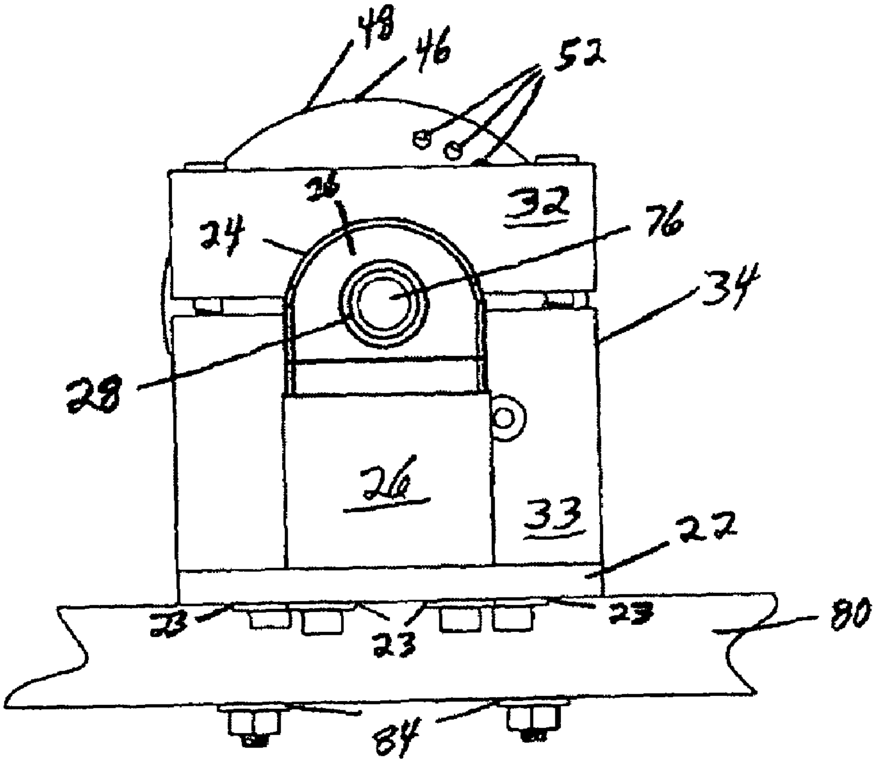
FIG. 6 is an end elevational view taken along line 6-6 of FIG. 5.
Figure 7:
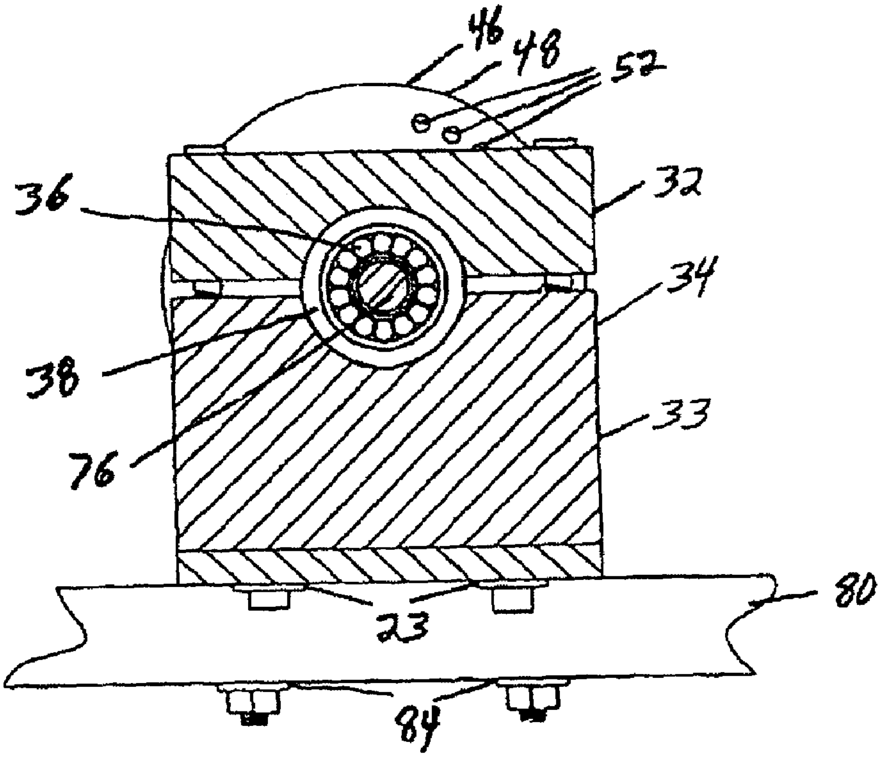
FIG. 7 is a cross-sectional view taken along line 7-7 of FIG. 5.

Referring now to FIGS. 3-5, the BRER 10 further comprises a pair of magnetic roll bearing assemblies 24. Each magnetic roll bearing assembly 24 houses a free end portion of the magnetic roll shaft 76 of the magnetic roll 72, with a first roll bearing assembly 24 proximate the drive coupling 16 and a second roll bearing assembly 24 located at an opposing end of the BRER 10. Each magnetic roll bearing assembly 24 comprises a magnetic roll bearing housing 26 and a circular magnetic roll bearing 28. Fasteners extend up through holes 23 in each support plate 22 and into holes in a bottom of a respective magnetic roll bearing housing 26 to secure the magnetic roll bearing housing 26 to the support plate 22. The magnetic roll bearing housing 26 houses the magnetic roll bearing 28. The magnetic roll bearing 28 surrounds the free end portion of the magnetic roll shaft 76 as the shaft 76 passes axially through a passage in the center of the magnetic roll bearing 28. The magnetic roll bearing 28 functions to permit the magnetic roll shaft 76 to rotate easily within the magnetic roll bearing 28 without causing damage to the shaft 76.

Figure 10:
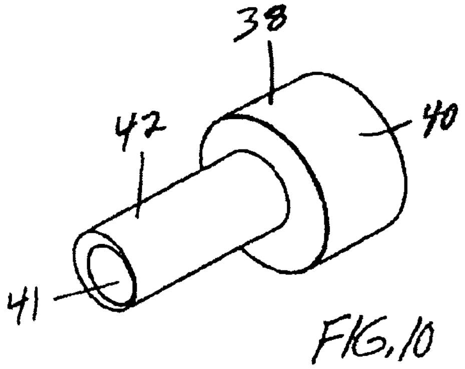
FIG. 10 is a left side perspective view of a magnetic roll cam used in the first embodiment, FIGS. 1-9.
Figure 11:
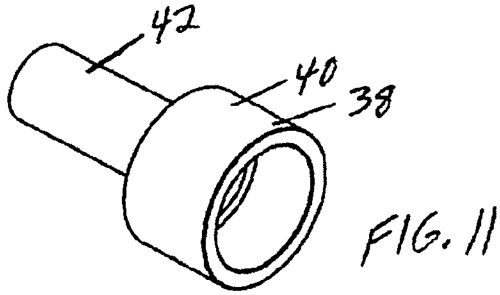
FIG. 11 is a right side perspective view of FIG. 10.

Referring now to FIGS. 10 and 11, the BRER 10 further comprises a pair of magnetic roll cams 38. Each magnetic roll cam 38 comprises a body 40 and an extension 42 that together form one unitary construction. The body 40 is a substantially hollow cylinder partially closed at an end. The extension 42 is a substantially elongated cylinder that extends laterally from the approximate center of the partially closed end of the body 40. A bore 41, set off center, runs through the length of the extension 42 and through the partially closed end of the body 40.

Referring now to FIGS. 2-5, the BRER 10 further comprises a pair of magnetic roll cam bearings 36. Each magnetic roll cam bearing 36 is housed within the hollow opening of the body 40 of a respective magnetic roll cam 38. The magnetic roll cam bearing 36 surrounds a middle portion of the magnetic roll shaft 76 of a respective magnetic roll 72 as the shaft 76 passes axially through a hole in the approximate center of the magnetic roll cam bearing 36. The magnetic roll cam bearing 36 functions to permit the magnetic roll shaft 76 to rotate easily within the magnetic roll cam bearing 36 without the shaft 76 incurring damage.

Referring now to FIGS. 3-5, the BRER 10 further comprises a pair of clamping blocks 34. Each clamping block 34 is located at opposing ends of the BRER 10 between the shell 18 and a respective magnetic roll bearing assembly 24. Each clamping block 34 comprises a top portion 32 and a bottom portion 33. Centrally located in a lower area of the top portion 32 is an arcuate opening, while centrally located in an upper area of the bottom portion 33 is also an arcuate opening, such that when the top portion 32 and bottom portion 33 are brought together, the respective arcuate openings align to form a hole 35 (see FIG. 1) in the clamping block 34. Fasteners extend up through holes 23 in each support plate 22 and into holes in the bottom portion 33 of a respective clamping block 34 to secure the clamping block 34 to the support plate 22. The body 40 (see FIGS. 3 and 4) of a respective magnetic roll cam 38 passes through the hole 35 in the center portion of a respective clamping block 34. The top portion 32 of the clamping block 34 extends above the magnetic roll cam 38, while the bottom portion 33 extends below the magnetic roll cam 38. The magnetic roll cam 38 is held in position by tightening fasteners that attach the top portion 32 of the clamping block 34 to the bottom portion 33. It is important to secure the magnetic roll cam 38 in place so that it does not move out of position while the drive motor 14 is energized. It is possible, however, to unsecure the magnetic roll cams 32 and reposition them, thereby adjusting the clearance or degree of contact between the magnetic roll 72 and the shell 18, while the drive motor 14 is still engaged. To reposition the magnetic roll cam 38, the fasteners attaching the top 32 and bottom portions 33 of the clamping block 34 are loosened or removed and the magnetic roll cam 38 is rotated.

Figure 14:
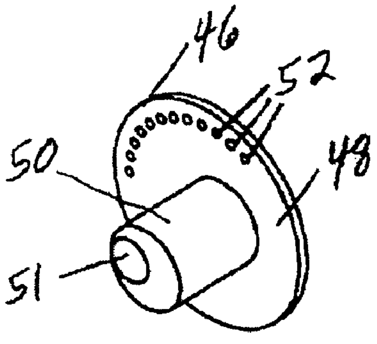
FIG. 14 is a left side perspective view of a shell cam used in the first embodiment, FIG. 1-9.
Figure 15:
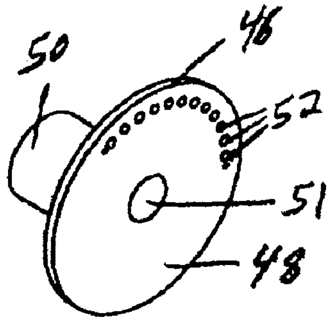
FIG. 15 is a right side perspective view of FIG. 14.

Referring now to FIGS. 14 and 15, the BRER 10 further comprises a pair of shell cams 46. Each shell cam 46 comprises a positioning disc 48 and an extension 50 that together form one unitary construction. The extension 50 is a substantially elongated cylinder that extends laterally from the approximate center of a side of the positioning disc 48. A bore

51, set off center, runs through the length of the extension 50. The positioning disc 48 is substantially circular with small spaced calibration holes 52. The calibration holes 52 are used to position the line of contact between the magnetic roll 72 and the inner surface 17 of the shell 18. Aligning the calibration holes 52 in a first shell cam 46 with the calibration holes 52 in an opposing shell cam 46 ensures that the magnetic roll 72 remains in alignment along the length of the inner surface 17 of the shell 18. Since under normal operation the magnetic roll 72 remains in constant contact with the inner surface 17 of the shell 18, it is important for normal operation that proper alignment be maintained (see FIG. 9). Once aligned, the shell cams 46 are secured in place so as not to move out of position while the drive motor 14 is operating. It is possible, however, to unsecure the shell cams 46 and use them to adjust the line of contact while the drive motor 14 is operating.

Referring now to FIGS. 2-5, the BRER 10 further comprises a pair of shell cam bearings 44. Each shell cam bearing 44 is located above the extension 50 of a respective shell cam 46 and below a respective end plate 30 and between the positioning disc 48 of the respective shell cam 46 and the body 74 of the magnetic roll 72. The shell cam bearing 44 comprises an outer race 43 and an inner race 45. The inner race 45 is fastened to the extension 50 of the respective shell cam 46, while the outer race 43 supports the respective end plate 30 so as to allow the end plate 30 to rotate freely about the shell cam bearing 44, thereby allowing for smooth rotation of the shell 18.

Figure 8:
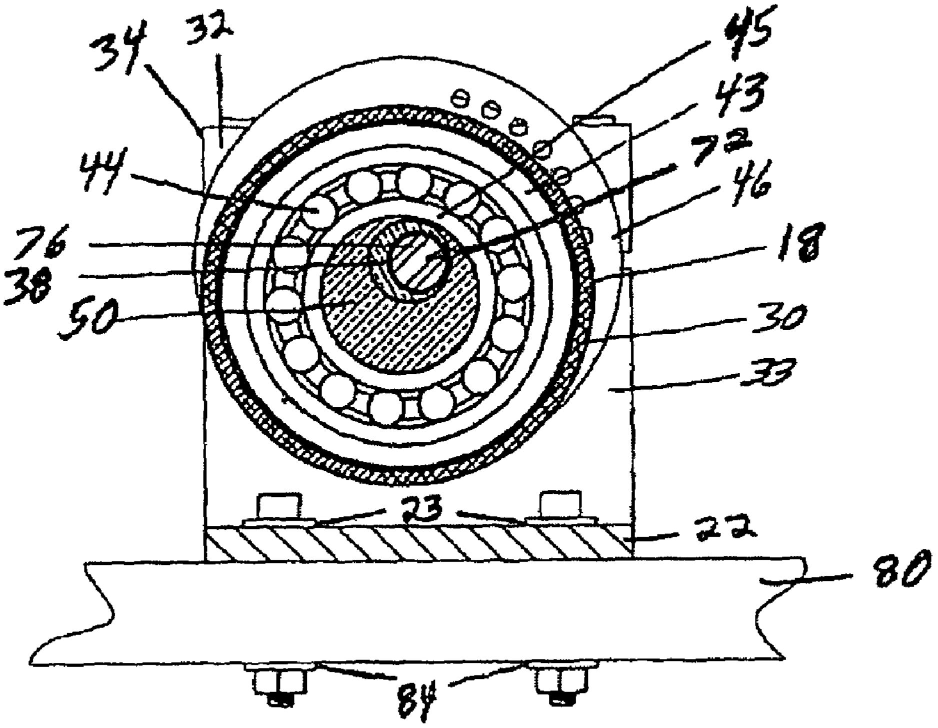
FIG. 8 is a cross-sectional view taken along line 8-8 of FIG. 5.
Figure 9:
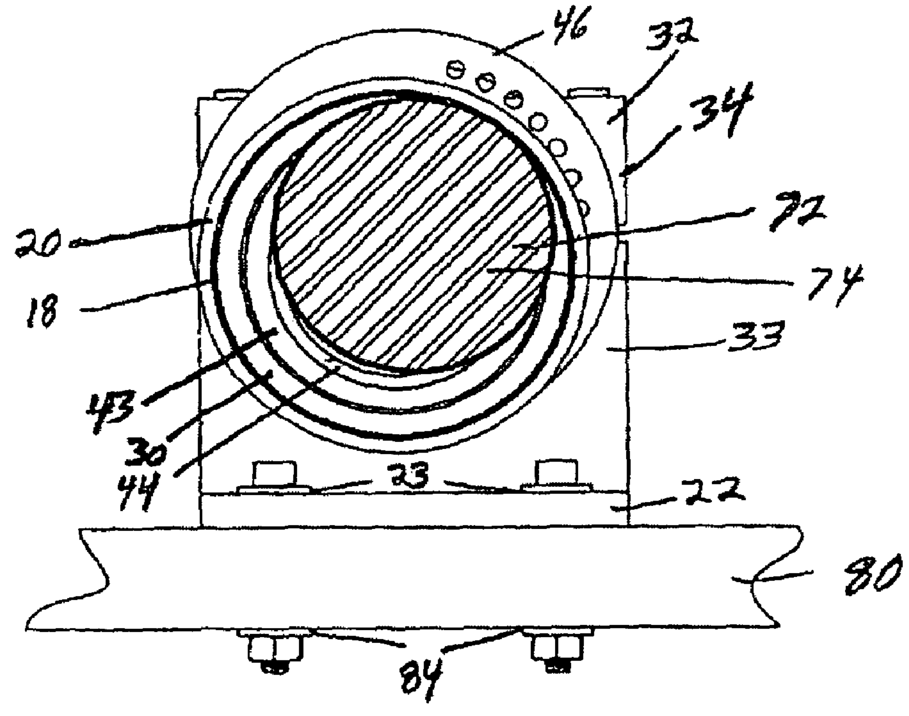
FIG. 9 is a cross-sectional view taken along line 9-9 of FIG. 5.
Figure 12:
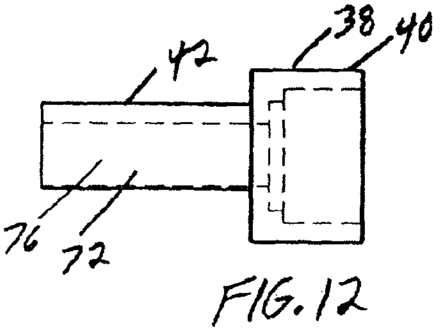
FIG. 12 is a top plan view of FIG. 10.
Figure 13:
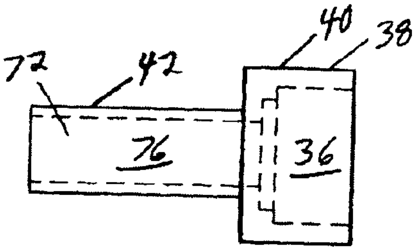
FIG. 13 is a front elevational view of FIG. 10.

Referring now to FIGS. 2-5, 8, 12, and 13, each of the pair of magnetic roll cams 38 is located at opposing ends of the BRER 10, between a respective magnetic roll bearing assembly 24 and the body 74 of the magnetic roll 72, as shown in FIGS. 2-5. The diameter of the bore 41 of the extension 42 of each magnetic roll cam 38 is just large enough to receive a respective shaft 76 of the magnetic roll 72, leaving little clearance between the outside surface of the shaft 76 and the inside surface of the bore 41, as shown in FIGS. 8, 12, and 13.

Figure 16:
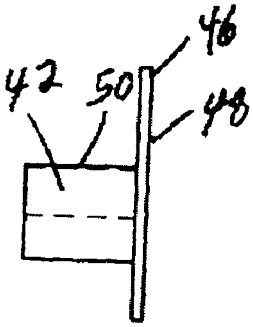
FIG. 16 is a top plan view of FIG. 14.
Figure 17:
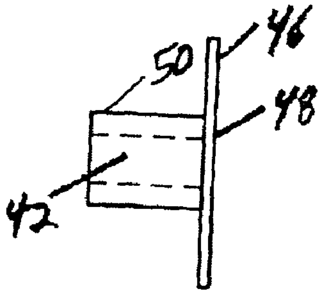
FIG. 17 is a front elevational view of FIG. 14.

Referring now to FIGS. 2-5, 8, 16, and 17, each of the pair of shell cams 46 is also located at opposing ends of the BRER 10, between a respective clamping block 34 and the body 74 of the magnetic roll 72, as shown in FIGS. 2-5. The diameter of the bore 51 of the extension 50 of each shell cam 46 is just large enough to receive the extension 42 of a respective magnetic roll cam 38, leaving little clearance between the outside surface of the extension 42 of the magnetic roll cam 38 and the inside surface of the bore 51, as shown in FIGS. 8, 16, and 17.

Referring now to FIGS. 8, 9, 10, 12, 14, and 16, the system of cams and bearings employed by the BRER 10 permit the magnetic roll 72 (see FIGS. 8, 9, 12, and 13) and the shell 18 (see FIGS. 8 and 9) each to rotate on its own independent axis. In addition, the bore 41 of the extension 42 of each magnetic roll cam 38 is off center. This allows for repositioning of the magnetic roll 72 relative to the shell 18, as described above with reference to FIGS. 3-5. Repositioning of the magnetic roll 72 is accomplished by eliminating the clearance between the magnetic roll 72 and the shell 18 and by adjusting the degree of contact or pressure between the two. In addition, the bore 51 of the extension 50 of each shell cam 46 is also off center. This allows for repositioning of the line of contact between the magnetic roll 72 and the shell 18 along the inner surface 17 of the shell 18, as described above with reference to FIGS. 14 and 15.

Regarding FIGS. 8, 9, 10, 12, 14, and 16, note that the system of cams and bearings employed by the BRER 10 can be configured differently in alternate embodiments. Also note that in an alternate embodiment, drive means 12 can be used to rotate a shell 18, and the shell 18 used to rotate a magnetic roll 72. In another alternate embodiment, drive means 12 can be employed to drive both a shell 18 and a magnetic roll 72.

Figure 18:
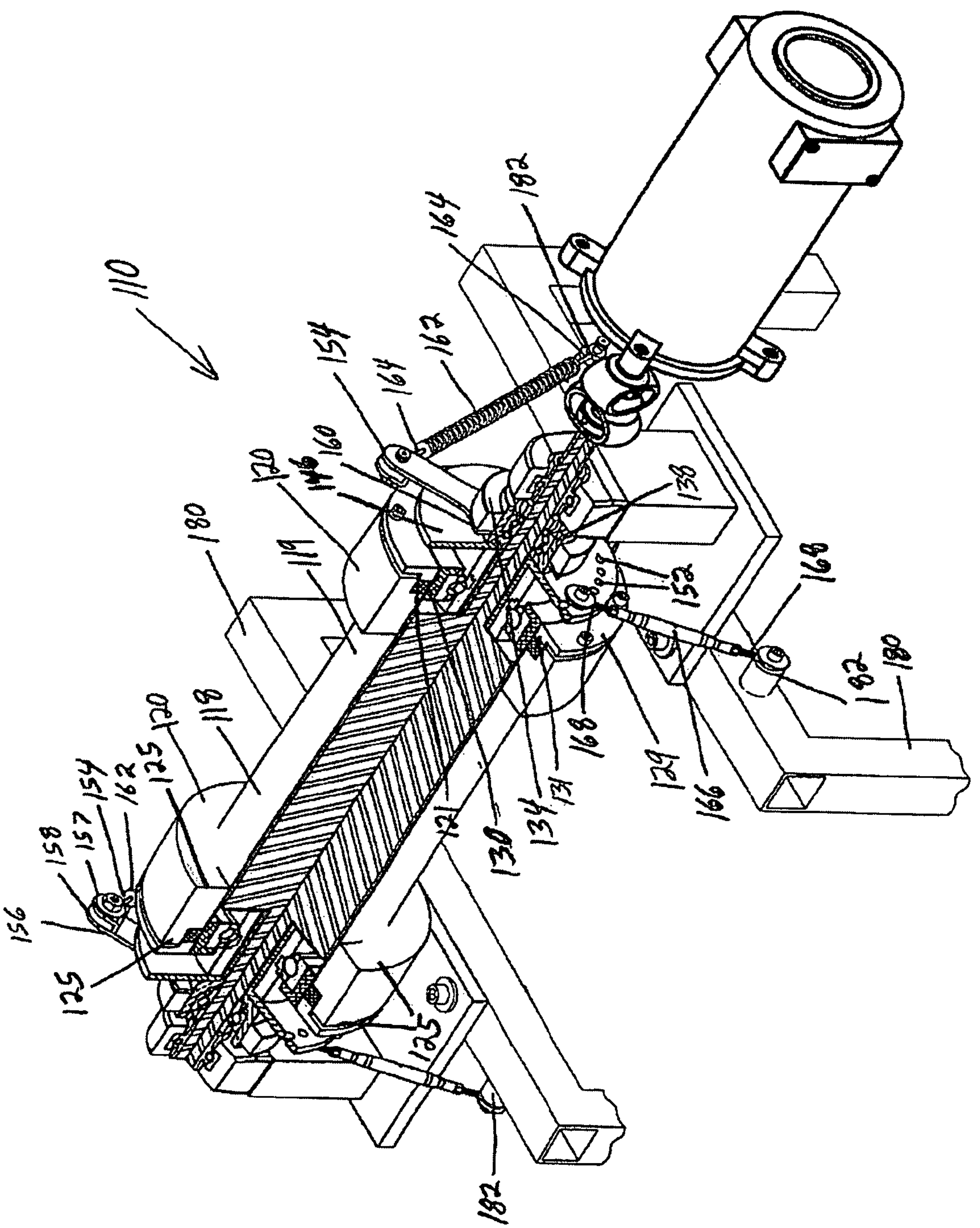
FIG. 18 is a cross-sectional view of a second embodiment of a beltless rare earth roll magnetic separator system, in accord with the present invention.

FIG. 18 depicts a second preferred embodiment of the BRER, designated generally by reference numeral 110.

Referring now to FIG. 18, the BRER 110 comprises a pair of hold-downs 166, a pair of magnetic roll cam containment sleeves 134, and a pair of tensioning assemblies 154. Each of the pair of hold-downs 166 is used to secure a respective shell cam 146 in position. An end 168 of a respective hold-down 166 is attached to an attachment mount 182 affixed to a platform 180. An opposing end 168 of the hold-down 166 is secured to a respective shell cam 146 using a fastener attached to the end 168 of the hold-down 166 and passed through a selected calibration hole 152 of the shell cam 146 and secured there.

Continuing with FIG. 18, each of the pair of containment sleeves 134 is substantially in the shape of a hollow cylinder. Each containment sleeve 134 encircles a respective magnetic roll cam 138 to secure the magnetic roll cam 138 in place. Each of the pair of tensioning assemblies 154 is located adjacent a respective containment sleeve 134. Each tensioning assembly 154 is comprised of a tensioning arm 156 and a tensioning spring 162 with opposing ends 164. The tensioning arm 156 has a bracket 157 and a base 160. The base 160 of a respective tensioning arm 156 is attached to a top portion of a respective magnetic roll cam 138 proximate a side of a respective containment sleeve 134 nearest the shell cam 146. The bracket 157 is attached to an end 158 of the tensioning arm 156 opposing the base 160. A first end 164 of a respective tensioning spring 162 is connected to the bracket 157 of the tensioning arm 156. A second opposing end 164 of the tensioning spring 162 is attached to an attachment mount 182 affixed to the platform 180. When the respective containment sleeve 134 is loosened from around the magnetic roll cam 138, the tensioning spring 162 provides a limited amount of stability to the magnetic roll cam 138 until the sleeve 134 can be re-secured. Meanwhile, the tensioning arm 156 can be lowered or raised to rotate the attached magnetic roll cam 138.

Continuing with FIG. 18, the BRER 110 further comprises a pair of support rings 120 and a pair of seal plates 129. Each of the pair of support rings 120 is substantially a hollow cylinder that vertically encircles a shell 118, fitting snugly around an outer surface 119 of the shell 118. Each support ring 120 is located at an opposing end of the shell 118 above a respective end plate 130. Each end of the shell 118 is aligned longitudinally along the approximate center of a respective support ring 120. A narrow, generally square groove 121 is cut in the underside of the support ring 120, extending inward from a first side 125 proximate a respective shell cam 146 and running the circumference of the support ring 120. Each of the pair of seal plates 129 is substantially a narrow ring with a short flange 131 extending laterally from a bottom edge of the seal plate 129. Each seal plate 129 is secured to the first side 125 of a respective support ring 120. The flange 131 of the seal plate 129 extends into the groove 121 of the support ring 120 generally filling the groove 121.

Figure 19:
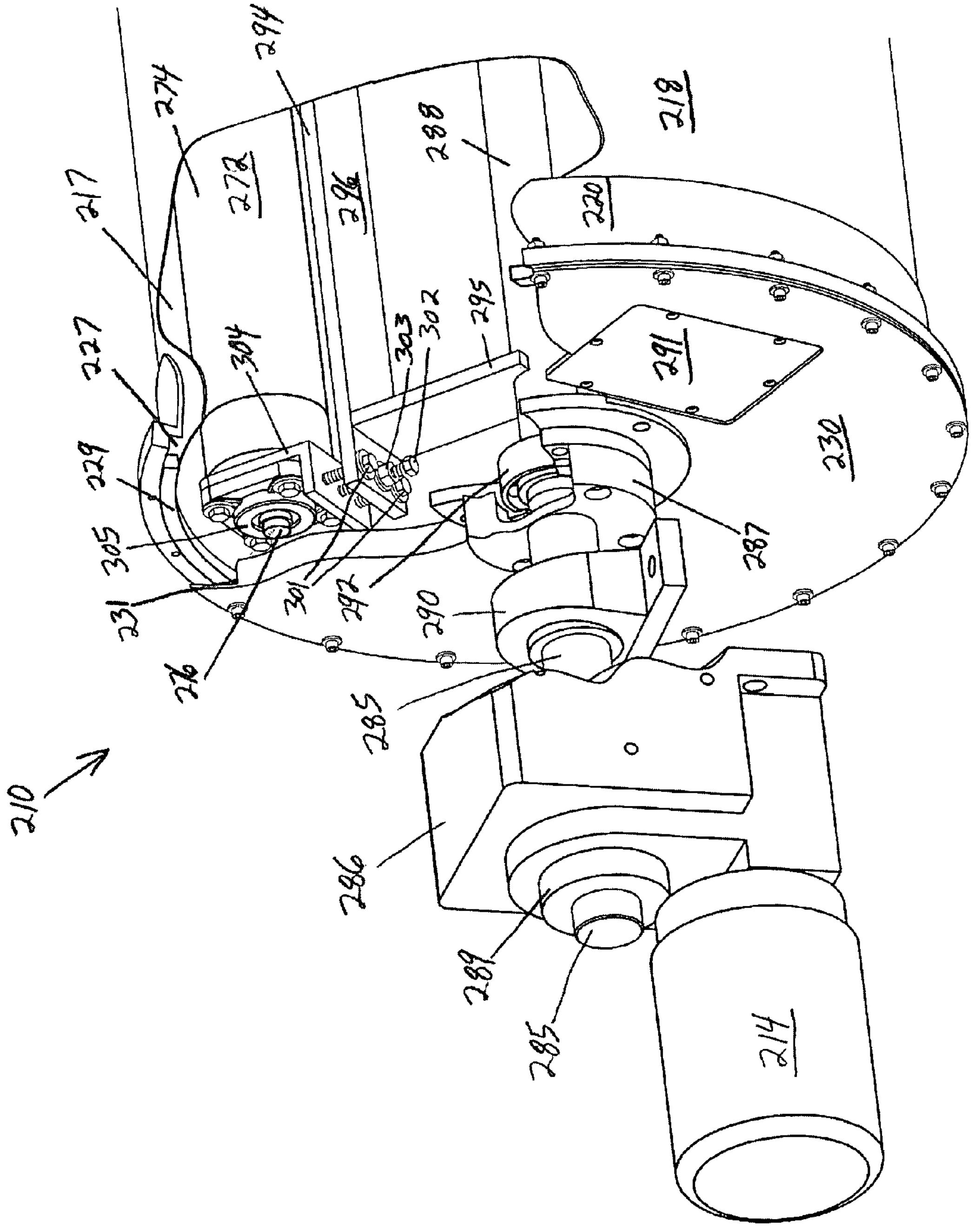
FIG. 19 is a partial cutaway view of a third embodiment of a beltless rare earth roll magnetic separator system, in accord with the present invention.

FIG. 19 depicts a third preferred embodiment of the BRER, designated generally by reference numeral 210.

Referring now to FIG. 19, the BRER 210 comprises drive means 214, a gearbox 286, a shell support shaft 285, a mid bearing assembly 290, an attachment housing 287, a magnet assembly support shaft 288, a pair of opposing magnet assembly support shaft bearings 292, and a pair of access doors 291. The gearbox 286 includes a forward bearing assembly 289. A first end portion of the shell support shaft 285 passes through the forward bearing assembly 289, a middle portion of the shell support shaft 285 passes through the mid bearing assembly 290, and an opposing second end of the shell support shaft 285 attaches to the attachment housing 287. Drive means 214 is attached to the shell support shaft 285 to provide rotational movement. The forward 289 and mid bearing assemblies 290 ensure that the shell support shaft 285 rotates smoothly.

Continuing with FIG. 19, the BRER 210 further comprises a pair of opposing support rings 220, a pair of opposing end plates 230, and a pair of opposing seal rings 229. Each of the pair of end plates 230 is substantially shaped like a thick disc. A narrow, generally rectangular groove 231 is cut in the underside of each end plate 230, extending inward from an outside edge of the end plate 230, and running the circumference of the end plate 230. Each end plate 230 is fitted to a shell 218 at a respective open end of the shell 218 and attached to a respective support ring 220. Each of the pair of support rings 220 vertically encircles the shell 218, fitting snugly around an outer surface 219 of the shell 218. Each support ring 220 is located at an opposing end of the shell 218 adjacent a respective end plate 230 to which the support ring 220 is attached. A narrow, generally rectangular groove 227 is cut in the underside of each support ring 220, extending inward from an outside edge of the support ring 220 proximate the respective end plate 230, and running the circumference of the support ring 220. The groove 227 of each respective support ring 220 and the groove 231 of each respective end plate 230 align to form a generally rectangular space spanning the circumference of the end plate 230 and support ring 220. Each of the pair of seal rings 229 is a length of material formed into a ring and shaped to fit within a respective rectangular space created by the alignment of the respective support ring 220 and end plate 230.

Still referring to FIG. 19, the attachment housing 287 is affixed to a first end plate 230 of the pair of opposing end plates 230. As the shell support shaft 285 rotates, the shaft 285 rotates the attachment housing 287, which in turn rotates the first end plate 230, which in turn rotates the shell 218. Each of the pair of magnet assembly support shaft bearings 292 is attached to the approximate center of a respective end plate 230. The magnet assembly support shaft 288 extends the length of the shell 218, with a pair of end portions each passing through a respective magnet assembly support shaft bearing 292. As the shell support shaft 285 rotates the first end plate 230, and thereby the shell 218, the magnet assembly support shaft bearings 292 rotate smoothly around the stationary magnet assembly support shaft 288. Each of the pair of access doors 291 is also attached to a respective end plate 230. The access doors 291 are removable and are used to gain entry to the interior of the shell 218.

Continuing with FIG. 19, the BRER 210 further comprises a magnet assembly 294. The magnet assembly 294 is contained within the shell 218 and comprises a magnetic roll 272, a pair of opposing upright supports 295, an elongated base plate 296, pulldown bolts 301, a pair of pushup lock bolts 302, a pair of lock nuts 303, a pair of opposing mounting plates 304, and a pair of opposing magnetic roll bearings 305. The magnetic roll 272 comprises an elongated magnetic roll body 274 and a pair of elongated magnetic roll shafts 276. Both the magnetic roll body 274 and the magnetic roll shafts 276 are generally cylindrical with the magnetic roll shafts 276 of smaller diameter than the magnetic roll body 274. Each magnetic roll shaft 276 extends longitudinally from a respective opposing end of the magnetic roll body 274.

Still referring to FIG. 19, each of the pair of upright supports 295 is a rectangular, generally vertical support. A first end of each upright support 295 attaches to the magnet assembly support shaft 288 and a second opposing end attaches to a bottom of the base plate 296 at opposing end portions of the base plate 296. The base plate 296 is rectangular and approximately equal in length to the magnetic roll 272. Each of the pair of mounting plates 304 is attached to an opposing end portion of the base plate 296, and each of the pair of magnetic roll bearings 305 is attached to a respective mounting plate 304. The body 274 of the magnetic roll 272 extends between the mounting plates 304. A hole in each mounting plate 304 is axially aligned with an open center of a respective magnetic roll bearing 305 such that a respective shaft 276 of the magnetic roll 272 is received through both the hole and the open center.

Continuing with FIG. 19, each of the pair of mounting plates 304 is attached to the base plate 296 by way of the pair of pulldown bolts 301, the pushup lock bolt 302 mounted between the pair of pulldown bolts 301, and the lock nut 303 threaded onto the pushup lock bolt 302. These bolts 301, 302 and the pair of nuts 303 allow for the radial adjustment of the mounting plates 304, and thereby for the radial adjustment of the magnetic roll 272 attached to the mounting plates 304. Adjusting the pulldown bolts 301 and the pushup lock bolt 302 for each mounting plate 304 allows one to position the magnetic roll 272 against an inner surface 217 of the shell 218 and also to adjust the contact pressure between the two. After final adjustments are made, the lock nut 303 for each mounting plate 304 is tightened to secure the magnetic roll 272 in the desired position. When the magnetic roll 272 is in contact with the inner surface 217 of the shell 218, the rotation of the shell 218 rotates the magnetic roll 272 in the magnetic roll bearings 305. Note that the magnet assembly support shaft 288 is angularly adjustable, allowing for the repositioning of the magnetic roll 272 relative to the shell 218. Note also that multiple magnetic rolls 272 can be added to the BRER 210, as described below with reference to FIGS. 21 and 22.

Figure 20:
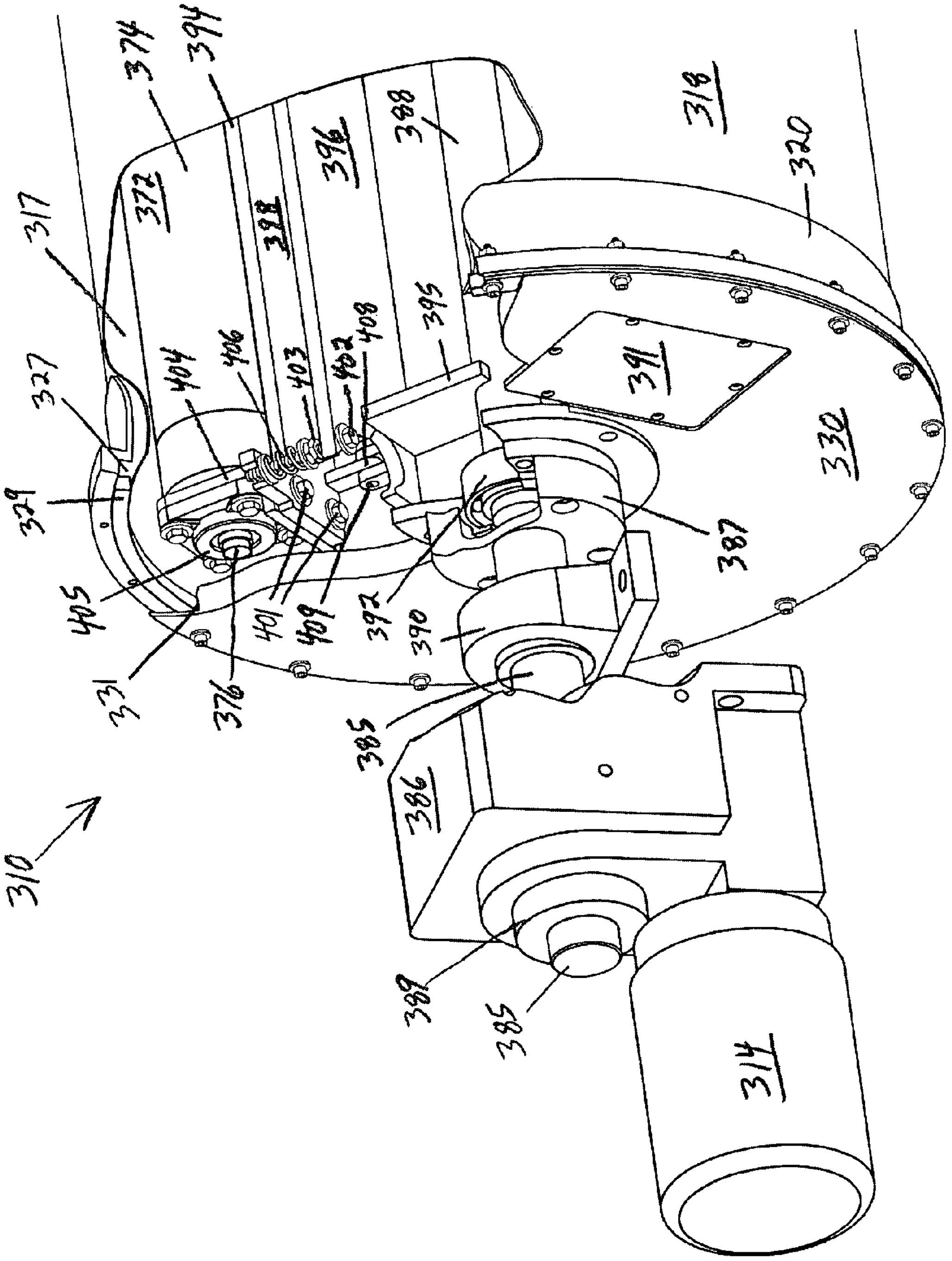
FIG. 20 is a partial cutaway view of a fourth embodiment of a beltless rare earth roll magnetic separator system, in accord with the present invention.

FIG. 20 depicts a fourth preferred embodiment of the BRER, designated generally by reference numeral 310. The BRER 310 comprises drive means 314, a gearbox 386, a shell support shaft 385, a mid bearing assembly 390, an attachment housing 387, a magnet assembly support shaft 388, a pair of opposing magnet assembly support shaft bearings 392, and a pair of access doors 391. The gearbox 386 includes a forward bearing assembly 389. A first end portion of the shell support shaft 385 passes through the forward bearing assembly 389, a middle portion of the shell support shaft 385 passes through the mid bearing assembly 390, and an opposing second end of the shell support shaft 385 attaches to the attachment housing 387. Drive means 314 is attached to the shell support shaft 385 to provide rotational movement. The forward 389 and mid bearing assemblies 390 ensure that the shell support shaft 385 rotates smoothly.

Continuing with FIG. 20, the BRER 310 further comprises a pair of opposing support rings 320, a pair of opposing end plates 330, and a pair of opposing seal rings 329. Each of the pair of end plates 330 is substantially shaped like a thick disc. A narrow, generally rectangular groove 331 is cut in the underside of each end plate 330, extending inward from an outside edge of the end plate 330, and running the circumference of the end plate 330. Each end plate 330 is fitted to a shell 318 at a respective open end of the shell 318 and attached to a respective support ring 320. Each of the pair of support rings 320 vertically encircles the shell 318, fitting snugly around an outer surface 319 of the shell 318. Each support ring 320 is located at an opposing end of the shell 318 adjacent a respective end plate 330 to which the support ring 320 is attached. A narrow, generally rectangular groove 327 is cut in the underside of each support ring 320, extending inward from an outside edge of the support ring 320 proximate the respective end plate 330, and running the circumference of the support ring 320. The groove 327 of each respective support ring 320 and the groove 331 of each respective end plate 330 align to form a generally rectangular space spanning the circumference of the end plate 330 and support ring 320. Each of the pair of seal rings 329 is a length of material formed into a ring and shaped to fit within a respective rectangular space created by the alignment of the respective support ring 320 and end plate 330.

The attachment housing 387 is affixed to a first end plate 330 of the pair of opposing end plates 330. As the shell support shaft 385 rotates, the shaft 385 rotates the attachment housing 387, which in turn rotates the first end plate 330, which in turn rotates the shell 318. Each of the pair of magnet assembly support shaft bearings 392 is attached to the approximate center of a respective end plate 330. The magnet assembly support shaft 388 extends the length of the shell 318, with a pair of end portions each passing through a respective magnet assembly support shaft bearing 392. As the shell support shaft 385 rotates the first end plate 330, and thereby the shell 318, the magnet assembly support shaft bearings 392 rotate smoothly around the stationary magnet assembly support shaft 388. Each of the pair of access doors 391 is also attached to a respective end plate 330. The access doors 391 are removable and are used to gain entry to the interior of the shell 318.

The BRER 310 further comprises a magnet assembly 394. The magnet assembly 394 is contained within the shell 318 and comprises a magnetic roll 372, a pair of opposing upright supports 395, an elongated base plate 396, a pivot plate 398, two pairs of bolts 401, a pair of compression bolts 402, a pair of compression springs 406, a pair of adjusting nuts 403, a pair of opposing mounting plates 404, a pair of opposing magnetic roll bearings 405, and a pair of hinge assemblies 408 each with a hinge pin 409. The magnetic roll 372 comprises an elongated magnetic roll body 374 and a pair of elongated magnetic roll shafts 376. Both the magnetic roll body 374 and the magnetic roll shafts 376 are generally cylindrical with the magnetic roll shafts 376 of smaller diameter than the magnetic roll body 374. Each magnetic roll shaft 376 extends longitudinally from a respective opposing end of the magnetic roll body 374.

Continuing with FIG. 20, each of the pair of upright supports 395 is a rectangular, generally vertical support. A first end of each upright support 395 attaches to the magnet assembly support shaft 388 and a second opposing end attaches to a bottom of the base plate 396 at opposing end portions of the base plate 396. The base plate 396 is rectangular and approximately equal in length to the magnetic roll 372. A notch appears at each opposing end of the base plate 396 to allow room for each hinge assembly 408 to pivot, as described below.

The pivot plate 398 is rectangular and approximately equal in length to the base plate 396. The pivot plate 398 is located above the base plate 396, between the base plate 396 and the inner surface 317 of the shell 318, and is attached to the base plate 396 by way of the pair of compression bolts 402 and the pair of hinge assemblies 408. Each of the pair of compression bolts 402 extends through an opposing end of the base plate 396 into a corresponding end of the pivot plate 398, along one edge of the plates 396, 398. Each of the pair of hinge assemblies 408 extends between the base plate 396 and the pivot plate 398 connecting the two plates 396, 398 along a respective edge opposing the edge proximate the compression bolt 402. Each of the pair of compression springs 406 fits over a respective compression bolt 402 between the base plate 396 and the pivot plate 398. Each of the pair of adjusting nuts 403 threads onto a respective compression bolt 402 and is used to compress or relax a respective compression spring 406.

Continuing with FIG. 20, each of the pair of mounting plates 404 is attached to an opposing end portion of the pivot plate 398, and each of the pair of magnetic roll bearings 405 is attached to a respective mounting plate 404. The body 374 of the magnetic roll 372 extends between the mounting plates 404. A hole in each mounting plate 404 is axially aligned with an open center of a respective magnetic roll bearing 405 such that a respective shaft 376 of the magnetic roll 372 is received through both the hole and the open center. Each of the pair of mounting plates 404 is attached to the pivot plate 398 by a pair of the two pairs of bolts 401. Each of the adjusting nuts 403 can be threaded further onto a respective compression bolt 402 to compress the respective compression spring 406. This forces the respective hinge assembly 408 to pivot outwardly on its hinge pin 409 in a radial direction, bringing the magnetic roll 372 closer to, or in contact with, the inner surface 317 of the shell 318. Once the magnetic roll 372 is brought into contact with the inner surface 317, the adjusting nut 403 can be further threaded onto the compression bolt 402 to compress the compression spring 406 more, thereby forcing the hinge assembly 408 to pivot outwardly further, increasing the contact pressure between the magnetic roll 372 and the inner surface 317 of the shell 318. When the magnetic roll 372 is in contact with the inner surface 317 of the shell 318, the rotation of the shell 318 rotates the magnetic roll 372 in the magnetic roll bearings 405. Note that the magnet assembly support shaft 388 is angularly adjustable, allowing for the repositioning of the magnetic roll 372 relative to the shell 318. Note also that multiple magnetic rolls 372 can be added to the BRER 310, as described below with reference to FIGS. 21 and 22.

Figure 21:
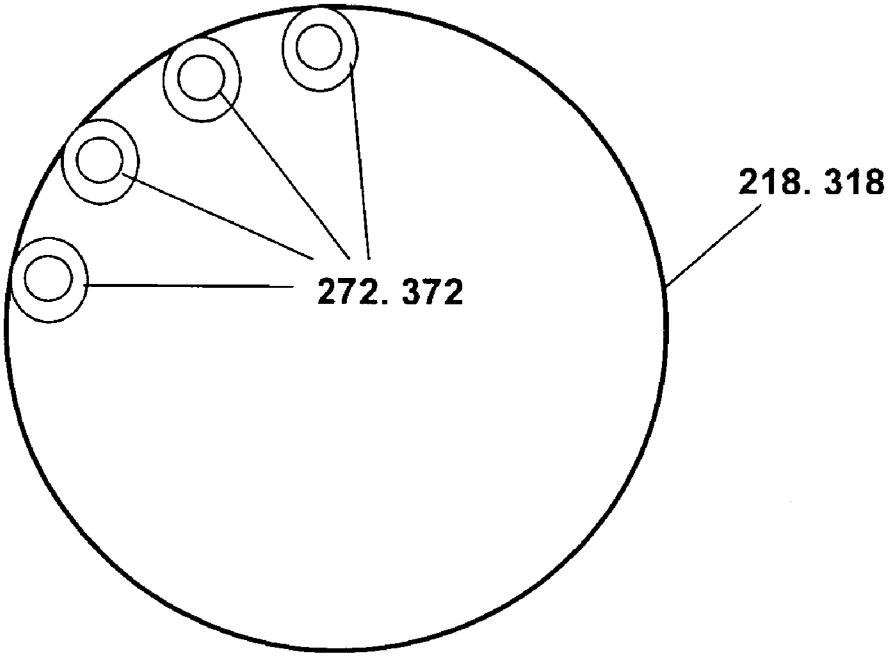
FIG. 21 is an end elevational view of the third embodiment of FIG. 19 showing multiple magnetic rolls.

Referring now to FIG. 21, the third and fourth embodiments 210, 310 of the present invention, depicted by FIGS. 19 and 20 respectively, are capable of being equipped with multiple magnetic rolls 272, 372. These multiple magnetic rolls 272, 372 may include magnetic rolls 272, 372 of radial pole design, axial pole design, or some magnetic rolls 272, 372 of radial pole design and other magnetic rolls 272, 372 of axial pole design.

Figure 22:
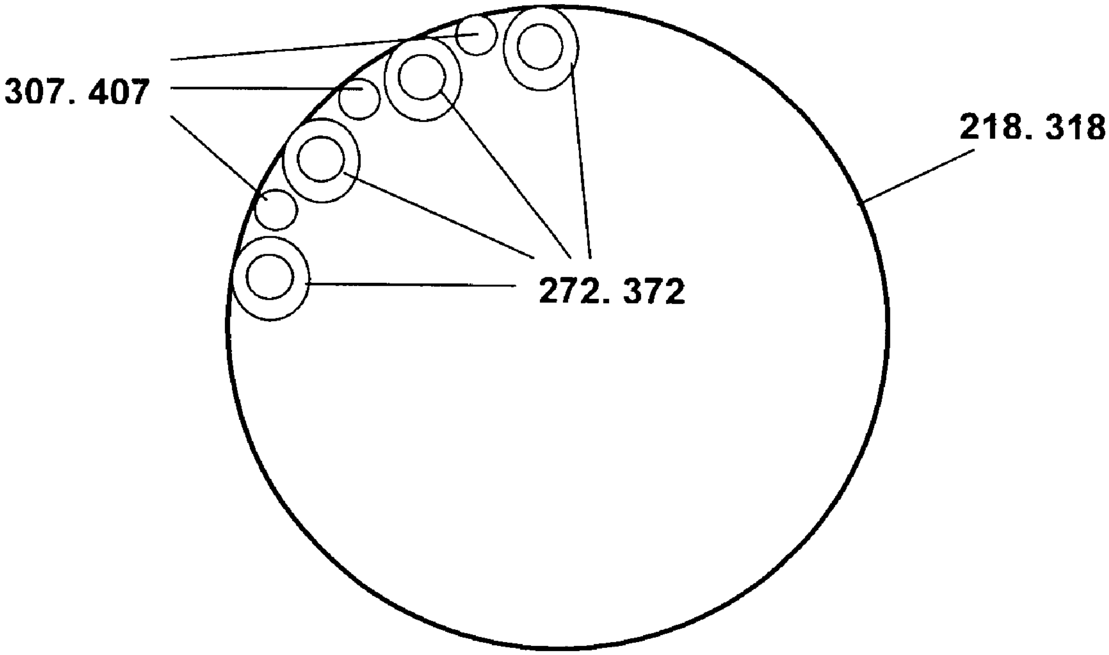
FIG. 22 is an end elevational view of FIG. 21 showing multiple magnetic rolls together with dummy rolls.

Referring now to FIG. 22, the third and fourth embodiments 210, 310 of the present invention, depicted by FIGS. 19 and 20 respectively, may be equipped with a nonmagnetic type of roll called a dummy roll 307, 407. One or more dummy rolls 307, 407 are used for maintaining and supporting the structural integrity of a shell 218, 318, such as when the shell 218, 318 is struck by tramp iron or other possibly harmful elements. Generally, dummy rolls 307, 407 will have smaller diameters than associated magnetic rolls 272, 372. This smaller size allows the dummy rolls 307, 407 to support more of the unsupported areas of the shell 218, 318 between the magnetic rolls 272, 372.

Figure 23:
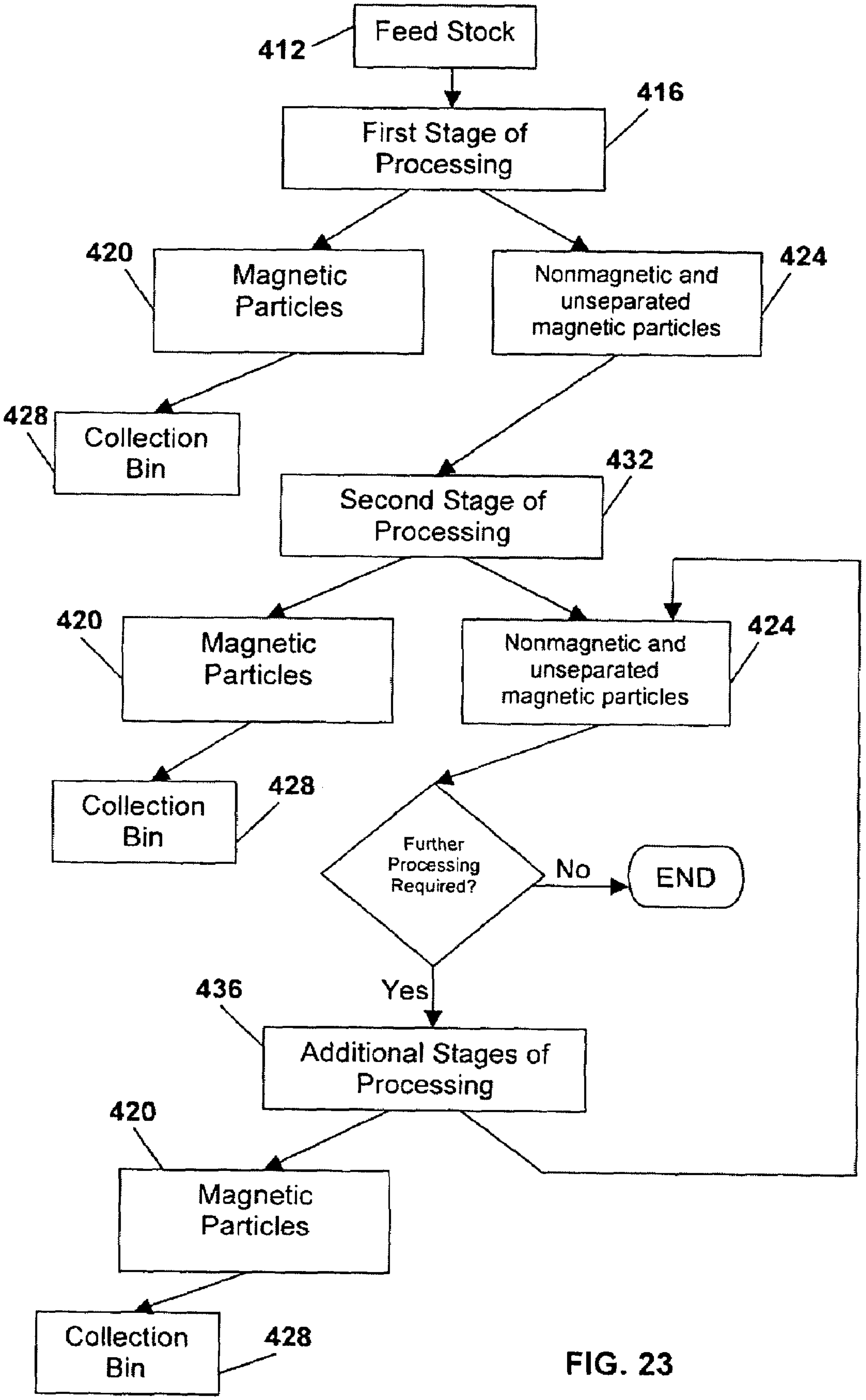
FIG. 23 is a flow diagram of a method for using a beltless rare earth roll magnetic separator system, in accord with the present invention.

Embodying the principles of the present invention is a method for processing and retreating feedstock using the BRER system, a preferred embodiment of which is depicted in FIG. 23 and designated generally by reference numeral 410.

Referring now to FIG. 23, processing and retreating feedstock 412 using a BRER separator 410 involves introducing the initial feedstock 412 to a BRER separator 410 in a first stage of processing 416 to retrieve at least two streams of product 420, 424. One stream is collected as an end-product 428, while the other stream 424 serves as feedstock for retreatment. The previously-processed feedstock 424 is then introduced to a second BRER separator 410 in a second stage of processing 432. Again, at least two streams of product 420, 424 result. One stream is collected as end-product 428, while the other stream 424 may go on to be retreated in a third or successive stages 436 using a succession of BRER separators 410.

Regarding FIG. 23, the BRER system 410 offers a number of variations on processing and retreating feedstock. In one embodiment, each stage of processing or retreating uses a single-roll BRER separator to process the feedstock. In an alternate embodiment, a multi-roll BRER separator is used to process one input of feedstock in several stages, each magnetic roll of the multi-roll BRER serving as a stage of processing. In yet another alternate embodiment, multiple multi-roll BRER separators are used to process feedstock, with each magnetic roll of a first multi-roll BRER serving as a stage of processing, and each subsequent multi-roll BRER repeating the method of the first multi-roll BRER by employing each of its magnetic rolls to serve as a stage of processing.

It is to be understood that any of the embodiments of the present invention shown throughout this disclosure may be provided with a knock-off brush attached to a BRER for removing particles that remain caught in a magnetic field atop the shell during operation. Note also that any of the embodiments of the present invention may be provided with a shell that is elastically deformable, allowing for a line of contact to be expanded to encompass an "area of contact" by exerting enough contact pressure between a magnetic roll and an inner surface of the shell to stretch the shell surface to contact the magnetic roll over an area merely than just at a line.

While the present invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. A system for separating particles having varying degrees of magnetism comprising:

a substantially nonmagnetic, generally cylindrical, rotatable elongated shell having a pair of opposing open ends, an inner surface, and an outer surface;

means for directing particles to be separated onto said outer surface of said shell;

a magnet assembly substantially contained within said shell for magnetically separating said particles directed onto said outer surface of said shell, said magnet assembly including a rotatable, elongated magnetic roll with an outer cylindrical surface;

closure means for closing said opposing open ends of said shell so as to substantially prevent contaminates from contacting a portion of said magnet assembly within said shell;

adjustable means for movably contacting said inner surface of said shell with said outer cylindrical surface of said magnetic roll to enable rotation of said shell and said magnetic roll; and drive means for inducing rotational movement of said magnet assembly and said shell without slippage therebetween.

2. The system of claim 1, wherein said adjustable means includes a cam-and-bearing arrangement for enabling relative rotational movement of said magnetic roll and said shell.

3. The system of claim 2, wherein said elongated magnetic roll includes a generally cylindrical body and a pair of generally cylindrical shafts of smaller diameter than said body, each said shaft extending longitudinally from a respective opposing end of said body.

4. The system of claim 3, wherein:

said drive means attaches to one said shaft of said magnetic roll for rotating said magnetic roll; and said cam-and-bearing arrangement movably contacts said inner surface of said shell with said outer surface of said magnetic roll such that rotation of said magnetic roll on said inner surface of said shell rotates said shell.

5. The system of claim 4, wherein said closure means include a pair of substantially cylindrical end plates, each fitted adjacent to said shell at a respective said opposing open end of said shell.

6. The system of claim 5, wherein substantially cylindrical spaced support rings vertically encircle portions of said shell for maintaining and supporting structural integrity of said shell.

7. The system of claim 6, wherein:

said cam-and-bearing arrangement includes a pair of opposing rotatable magnetic roll cams and a pair of opposing rotatable shell cams, each said magnetic roll cam housing a portion of a respective said shaft of said magnetic roll such that said respective shaft rotates freely within each said magnetic roll cam, each said shell cam housing a portion of a respective said magnetic roll cam and said shell cam adjustably positionable relative to said shell such that said line of contact between said inner surface of said shell and said outer surface of said magnetic roll can be adjustably positioned relative to said shell, said shell freely rotatable around said shell cams, and each said magnetic roll cam adjustably positionable relative to a respective said shell cam such that said outer surface of said magnetic roll can be movably contacted with said inner surface of said shell and the degree of contact between said inner surface of said shell and said outer surface of said magnetic roll can be adjustably altered; and each said shell cam of said cam-and-bearing arrangement having a plurality of calibration holes for aligning a first said shell cam with a second said shell cam and for positioning said line of contact thereby.

8. The system of claim 1, wherein said shell is made of titanium.

9. The system of claim 1, wherein said adjustable means adjustably positions a line of contact between said inner surface of said shell and said outer surface of said magnetic roll, and said adjustable means alters the degree of contact between said inner surface of said shell and said outer surface of said magnetic roll.

10. The system of claim 1, wherein said shell is elastically deformable.

11. A system for separating particles of varying degrees of magnetism comprising:

a substantially nonmagnetic, generally cylindrical, elongated shell having a pair of opposing open ends, an inner surface, and an outer surface;

means for directing particles to be separated onto said outer surface of said shell;

a magnet assembly substantially contained within said shell for magnetically separating said particles directed onto said outer surface of said shell, said magnet assembly including:

at least one rotatable, elongated magnetic roll having a generally cylindrical body with an outer surface and a pair of generally cylindrical shafts of smaller diameter than said body, each said shaft extending longitudinally from a respective opposing end of said body;

a pair of opposing mounting plates for each magnetic roll, each said mounting plate having a hole therethrough and an attached magnetic roll bearing with an axially aligned open center such that a proximal end of said shaft of said magnetic roll is received through said open center and said hole; and a supporting means for supporting said mounting plates, said supporting means including a contacting means for movably contacting said inner surface of said shell with said outer surface of said body of said magnetic roll and for adjusting pressure of contact therebetween;

a pair of substantially cylindrical end plates, each fitted adjacent to said shell at a respective said opposing open end of said shell for closing said opposing open ends of said shell so as to substantially prevent contaminates from contacting a portion of said magnet assembly within said shell;

a positioning means for adjustably positioning a line or area of contact between said inner surface of said shell and said outer surface of said body of said magnetic roll of said magnet assembly;

a pair of access doors, each said access door movably attached to a respective said end plate for gaining access to interior of said shell; and a drive means for inducing rotational movement of said shell.

12. The system of claim 11, further comprising:

a rotatable shell support shaft attached to said drive means and to a first said end plate;

wherein said drive means rotates said support shaft thereby rotating said first end plate and said shell attached thereto; and said inner surface of said shell movably contacts said outer surface of said body of said magnetic roll of said magnet assembly such that rotation of said inner surface of said shell rotates said magnetic roll.

13. The system of claim 12, wherein:

said contacting means of said supporting means of said magnet assembly includes a pair of opposing upright supports, an elongated base plate approximately equal in length to said magnetic roll of said magnet assembly, and radially adjustable connectors;

said positioning means includes a substantially cylindrical magnet assembly support shaft rotatably fixed to each said end plate and housed substantially within said shell;

said pair of opposing upright supports adjustably positioned atop said magnet assembly support shaft between said support shaft and said base plate and attached to said base plate for adjustably supporting said base plate, each said upright support being located proximate a respective opposing end of said base plate;

said outer surface of said body of said magnetic roll being positioned proximate said inner surface of said shell by said base plate and said mounting plates of said magnet assembly; and said radially adjustable connectors attaching each said mounting plate to said base plate for eliminating clearance between said outer surface of said body of said magnetic roll and said inner surface of said shell and for adjusting pressure of contact therebetween.

14. The system of claim 13, further comprising substantially cylindrical, spaced support rings vertically encircling portions of said shell for maintaining and supporting structural integrity of said shell.

15. The system of claim 14, wherein said magnet assembly includes another magnetic roll repositionable relative to said at least one magnetic roll.

16. The system of claim 15, wherein one said magnetic roll is of radial pole design and a second said magnetic roll is of axial pole design.

17. The system of claim 15, further comprising at least one elongated, nonmagnetic dummy roll positioned in contact inwardly within said shell and rotatable therewith for maintaining and supporting structural integrity of said shell, said dummy roll being located between said at least one magnetic roll and said another magnetic roll with all such rolls rotating in the same direction.

18. The system of claim 17, wherein one said magnetic roll is of radial pole design and a second said magnetic roll is of axial pole design.

19. The system of claim 13, wherein said shell is elastically deformable.

20. The system of claim 13, wherein said shell is titanium with a thickness of about 0.005 inches.

21. The system of claim 12, wherein:

said contacting means of said supporting means of said magnet assembly includes a pair of opposing upright supports, an elongated base plate approximately equal in length to said magnetic roll of said magnet assembly, an elongated pivot plate located between said magnetic roll and said base plate and approximately equal in length to said magnetic roll, a pair of spaced hinge assemblies having aligned pivot points and located between said base plate and said pivot plate, and a pair of spaced radially adjustable compression spring means;

said positioning means includes a substantially cylindrical magnet assembly support shaft rotatably fixed to each said end plate and housed substantially within said shell;

said pair of opposing upright supports adjustably positioned atop said magnet assembly support shaft between said support shaft and said base plate and attached to said base plate for adjustably supporting said base plate, each said upright support being located proximate a respective opposing end of said base plate;

said outer surface of said body of said magnetic roll being positioned proximate said inner surface of said shell by said pivot plate and said mounting plates of said magnet assembly; and said pivot plate pivotally attached to said base plate by said hinge assemblies and said spring means such that adjustment of said spring means moves said pivot plate upon said pivot points for eliminating clearance between said outer surface of said body of said magnetic roll and said inner surface of said shell and for adjusting pressure of contact therebetween.

22. The system of claim 21, wherein each said spring means includes a compression spring, a nut, and an elongated bolt extending through said base plate and said pivot plate, said nut threaded onto said bolt above said base plate and engaged with a first end of said compression spring and an opposing second end of said compression spring engaged with said pivot plate.

23. A method of separating feedstock having magnetic particles and nonmagnetic particles using a beltless magnetic separator with an elongated, cylindrical, rotating, enclosed shell and at least one rotating, cylindrical magnetic roll disposed within the shell and movably contacting an inner surface of the shell comprising the steps of:

A) positioning a line or area of contact between the inner surface of the shell and the magnetic roll;

B) adjusting the contact pressure between the magnetic roll and the inner surface of the shell;

C) rotating the shell and the magnetic roll in the same direction without slippage therebetween;

D) directing the feedstock towards the outer surface of the shell at a plurality of selected spaced positions to create at least two resultant streams of processed feedstock from the shell; and E) collecting the two resultant streams of the processed feedstock.

24. The method of claim 23, wherein step C includes the step of:

F) providing another magnetic roll within the shell spaced from the magnetic roll and in contact with the shell in accord with steps A and B.

* * * * *